(12) United States Patent
Krause

(10) Patent No.: US 12,078,282 B2
(45) Date of Patent: Sep. 3, 2024

(54) INSULATION SYSTEM, METHOD OF INSTALLING THE INSULATION SYSTEM, AND CLIPS DISPOSED BETWEEN INSULATION PANELS

(71) Applicant: Advanced Architectural Products, LLC, Allegan, MI (US)

(72) Inventor: G. Matt Krause, Allegan, MI (US)

(*) Notice: Subject to any disclaimer, the term of this patent is extended or adjusted under 35 U.S.C. 154(b) by 38 days.

(21) Appl. No.: 17/576,751

(22) Filed: Jan. 14, 2022

(65) Prior Publication Data

US 2022/0243860 A1 Aug. 4, 2022

Related U.S. Application Data

(60) Provisional application No. 63/137,686, filed on Jan. 14, 2021.

(51) Int. Cl.
*E04B 1/76* (2006.01)
*E04B 1/61* (2006.01)
*F16L 59/12* (2006.01)

(52) U.S. Cl.
CPC .......... *F16L 59/123* (2013.01); *E04B 1/6116* (2013.01); *E04B 1/7608* (2013.01)

(58) Field of Classification Search
CPC .... E04B 2001/405; E04B 1/40; E04B 1/7629; E04B 1/7654; E04B 1/6116; E04B 1/7608; E04B 1/6145; E04B 1/6158; E04B 1/6162; E04F 13/0803; E04F 13/0805; E04F 13/081; E04F 13/0816; E04F 13/0821; E04F 13/0823; E04F 13/0826; E04F 13/0828; E04F 13/0835; E04F 13/0841; E04F 13/0846; E04D 3/362; E06B 3/5481

See application file for complete search history.

(56) References Cited

U.S. PATENT DOCUMENTS

| | | | | |
|---|---|---|---|---|
| 4,438,611 A | * | 3/1984 | Bryant | .................... E04F 19/06 52/410 |
| 4,545,103 A | * | 10/1985 | Bryant | .................. E04D 3/3602 29/525.04 |
| 5,950,389 A | * | 9/1999 | Porter | .................... E04C 2/296 403/DIG. 15 |

(Continued)

FOREIGN PATENT DOCUMENTS

| | | |
|---|---|---|
| GB | 2373001 B | 10/2003 |
| RU | 83267 U1 | 5/2009 |

(Continued)

*Primary Examiner* — Kyle J. Walraed-Sullivan
(74) *Attorney, Agent, or Firm* — The Watson IP Group, PLC; Jovan N. Jovanovic

(57) ABSTRACT

A system includes a plurality of a clip, the clip comprises a securing mechanism, a first side, a second side, a bottom end, and a top end. During installation of an insulation system a plurality of the clip are coupled to a support beam and disposed within a plurality of notches of a second insulation board. The plurality of clips further include a width that is substantially equal to a width of the plurality of notches such that during the installation of the insulation system the plurality of clips are disposable within the plurality of notches to allow a second side of a first insulation board to contact a first side of the second insulation board and the securing mechanism secures a back surface of the first insulation board against the plurality of clips.

12 Claims, 8 Drawing Sheets

(56) References Cited

U.S. PATENT DOCUMENTS

| | | | | |
|---|---|---|---|---|
| 6,490,838 | B2* | 12/2002 | Summerford | E04B 5/06 52/480 |
| 8,615,958 | B2* | 12/2013 | Kilgore | E04F 15/02183 52/650.3 |
| 10,619,354 | B1* | 4/2020 | Simonsen | E04F 13/0869 |
| 2001/0015042 | A1* | 8/2001 | Ballard | E04F 15/10 52/489.1 |
| 2002/0033000 | A1* | 3/2002 | Pantelides | E04B 1/043 52/745.1 |
| 2006/0185305 | A1* | 8/2006 | Schaffer | E04B 1/14 52/586.1 |
| 2009/0100780 | A1* | 4/2009 | Mathis | E04C 2/296 52/794.1 |
| 2016/0326739 | A1* | 11/2016 | Martel | E04F 13/0876 |
| 2017/0356181 | A1* | 12/2017 | Krause | E04B 1/40 |
| 2018/0010341 | A1* | 1/2018 | Krause | E04F 13/0817 |
| 2018/0187414 | A1* | 7/2018 | Kennedy | E04B 2/88 |
| 2019/0153733 | A1* | 5/2019 | Krause | E04B 1/7654 |
| 2019/0177981 | A1* | 6/2019 | Krause | E04F 13/0817 |
| 2022/0243463 | A1* | 8/2022 | Krause | E04F 13/0817 |

FOREIGN PATENT DOCUMENTS

| | | | |
|---|---|---|---|
| RU | 91727 | U1 | 2/2010 |
| WO | 2012134773 | A1 | 10/2012 |

* cited by examiner

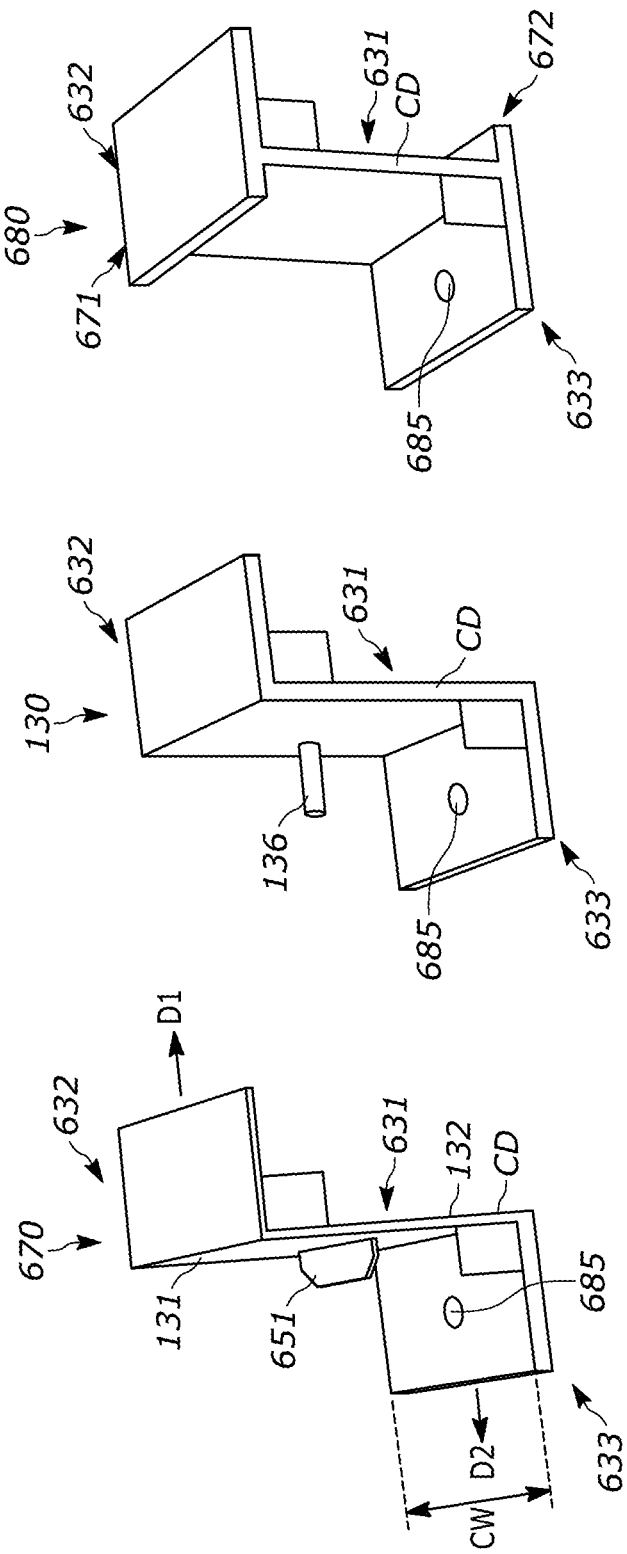

INSULATION SYSTEM, METHOD OF INSTALLING THE INSULATION SYSTEM, AND CLIPS DISPOSED BETWEEN INSULATION PANELS

CROSS-REFERENCE TO RELATED APPLICATION

This application claims priority from U.S. Provisional Patent Application Ser. No. 63/137,686 filed on Jan. 14, 2021, entitled "INSULATION SYSTEM INCLUDING CLIPS DISPOSED BETWEEN INSULATION PANELS", the entire disclosure of which is hereby incorporated by reference in its entirety.

BACKGROUND OF THE DISCLOSURE

1. Field of the Disclosure

The disclosure relates in general to an insulation system, and more particularly, to an insulation system that includes clips disposed between insulation panels.

2. Background Art

In the past, in order to provide a highly thermally efficient (metal) wall or (metal) roof assembly for a building enclosure, it has been necessary for metal materials, typically an exterior and interior metal skin, to be bonded to either side of an insulated panel core inside a factory thereby creating a foam panel. These metal skins are typically profiled and have offsets in them to prevent the exterior metal skin from contacting the interior metal skin. This is done in an effort to prevent metal to metal contact thereby reducing thermal conductivity from the outside of the building. Heat travels in the path of least resistance such that heat can invade a system and affect an interior atmosphere through relatively finite pathways such as fasteners and the like that have metal to metal contact with exterior conditions. Similarly, exterior exposure to cold temperatures can allow for infusion of cold temperatures into a wall construction along highly thermally conductive components.

Most applications of metal roof and wall assemblies retain at least some form of metal-to-metal contact through metal anchors, fasteners, or sill, transition, and window trim. Products of this type are subject to shorter warranties and life cycles due to the fact that the product is glued or otherwise bonded and is subject to damage and shortened life spans from thermal cycling which causes varying rates of contraction and expansion of the different materials and therefore wears significantly on any given system. Furthermore, these systems often require dissimilar materials to be in contact with each other which can lead to reactions such as oxidation which can corrode these materials over time. A metal wall, roof or deck system that creates a thermal break in the heat conductivity path thereby effectively eliminating or greatly reducing thermal bridging from exterior conditions to interior conditions that keeps like materials separate is desired.

SUMMARY OF THE DISCLOSURE

The disclosure is directed to an insulation system comprised of a first insulation board, a second insulation board, and a plurality of clips. The first insulation board includes a first end, a second end, a first side, a second side, a front surface, and a back surface. The first insulation board further includes a plurality of notches disposed along the first side of the first insulation board. The second insulation board includes a first end, a second end, a first side, a second side, a front surface, and a back surface. The second insulation board further includes the plurality of notches disposed along the first side of the second insulation board. The plurality of clips each including a securing mechanism, a first side, a second side, a bottom end, and a top end. During installation of the insulation system, the plurality of clips are coupled to a support beam and disposed within the plurality of notches of the second insulation board. The plurality of clips further including a width that is substantially equal to a width of the plurality of notches such that during the installation of the insulation system the plurality of clips are disposable within the plurality of notches to allow the second side of the first insulation board to contact the first side of the second insulation board. The securing mechanism secures the back surface of the first insulation board against the plurality of clips.

In at least one configuration of the system, a plurality of girts are coupled to the plurality of composite clips, such that a single one of the plurality of girts couples the plurality of composite clips that are disposed in substantially a straight line.

In at least one configuration of the system, a distance between any two of the plurality of clips and any two of the plurality of notches is substantially equal.

In at least one configuration of the system, the system further comprises a plurality of screws to couple the plurality of clips to the support beam.

In at least one configuration of the system, the plurality of clips each further include a body member that extends from the top end to the bottom end, a first end member disposed substantially perpendicular to the body member and extending in a first direction away from the body member, and a second end member disposed substantially perpendicular to the body member and extending in a second direction opposite the first direction.

In at least one configuration of the system, the securing mechanism includes a blade fixedly coupled substantially centrally to the body member of each of the plurality of clips, such that the blade is pushed into the second side of the first insulation board during installation of the first installation board.

In at least one configuration of the system, the securing mechanism includes a post fixedly coupled substantially centrally to the body member of each of the plurality of clips, such that the post is pushed into the second side of the first insulation board during installation of the first installation board.

In at least one configuration of the system, the securing mechanism includes a first lip fixedly coupled to the first end member, the first lip extending in the second direction, and further including a second lip fixedly coupled to the second end member, the second lip extending in the first direction.

In at least one configuration of the system, the system further comprises a plurality of girts coupled to the plurality of clips, the plurality of girts being disposed substantially perpendicular to a height of the first and second insulation board, during installation of the insulation system.

In at least one configuration of the system, the system further comprises a plurality of girts coupled to the plurality of clips, the plurality of girts being disposed substantially perpendicular to a height of the first and second insulation boards, during installation of the insulation system.

In at least one configuration of the system, the system further comprises cladding coupled to the plurality of girts.

In at least one configuration of the system, the plurality of clips are comprised of a composite material to mitigate heat transfer from the bottom end of the plurality of clips to the top end of the plurality of clips.

In at least one configuration of the system, the composite material is a resin and fiber, the fiber comprised of at least one of glass fibers, carbon fibers, cellulose fibers, nylon fibers, and aramid fibers.

The disclosure is also directed to a clip comprising a securing mechanism, a first side, a second side, a bottom end, and a top end. During installation of an insulation system a plurality of the clip are coupled to a support beam and disposed within a plurality of notches of a second insulation board. The plurality of clips further include a width that is substantially equal to a width of the plurality of notches such that during the installation of the insulation system the plurality of clips are disposable within the plurality of notches to allow a second side of a first insulation board to contact a first side of the second insulation board and the securing mechanism secures a back surface of the first insulation board against the plurality of clips.

In at least one configuration of the clip, the clip includes a body member that extends from the top end to the bottom end, a first end member disposed substantially perpendicular to the body member and extending in a first direction away from the body member, and a second end member disposed substantially perpendicular to the body member and extending in a second direction opposite the first direction.

In at least one configuration of the clip, the securing mechanism includes a blade fixedly coupled substantially centrally to the body member of the clip, such that the blade is pushed into the second side of the first insulation board during installation of the first installation board.

In at least one configuration of the clip, the securing mechanism includes a post fixedly coupled substantially centrally to the body member of the clip, such that the post is pushed into the second side of the first insulation board during installation of the first installation board.

In at least one configuration of the clip, the securing mechanism includes a first lip fixedly coupled to the first end member, the first lip extending in the second direction, and further including a second lip fixedly coupled to the second end member, the second lip extending in the first direction.

In at least one configuration of the clip, the plurality of clips are comprised of a composite material to mitigate heat transfer from the bottom end of the plurality of clips to the top end of the plurality of clips, the composite material being a resin and fiber, the fiber comprised of at least one of glass fibers, carbon fibers, cellulose fibers, nylon fibers, and aramid fibers.

The disclosure is also directed to a method of installing an insulation system. The insulation system comprises a first insulation board including a first end, a second end, a first side, a second side, a front surface, and a back surface, the first insulation board including a plurality of notches disposed along the first side of the first insulation board. The insulation system further comprises a second insulation board including a first end, a second end, a first side, a second side, a front surface, and a back surface, the second insulation board including the plurality of notches disposed along the first side of the second insulation board; and a plurality of clips each including a securing mechanism, a first side, a second side, a bottom end, and a top end. The method comprises coupling the plurality of clips to a support beam, disposing within the plurality of notches of the second insulation board, the plurality of clips further including a width that is substantially equal to a width of the plurality of notches. The method further comprises disposing the plurality of clips within the plurality of notches to allow the second side of the first insulation board to contact the first side of the second insulation board; and securing, with the securing mechanism, the back surface of the first insulation board against the plurality of clips.

BRIEF DESCRIPTION OF THE DRAWINGS

The disclosure will now be described with reference to the drawings wherein:

FIGS. 6a, 6b, and 6c illustrate various configurations for the clips, in accordance with at least one configuration;

DETAILED DESCRIPTION OF THE DISCLOSURE

Figure 1:
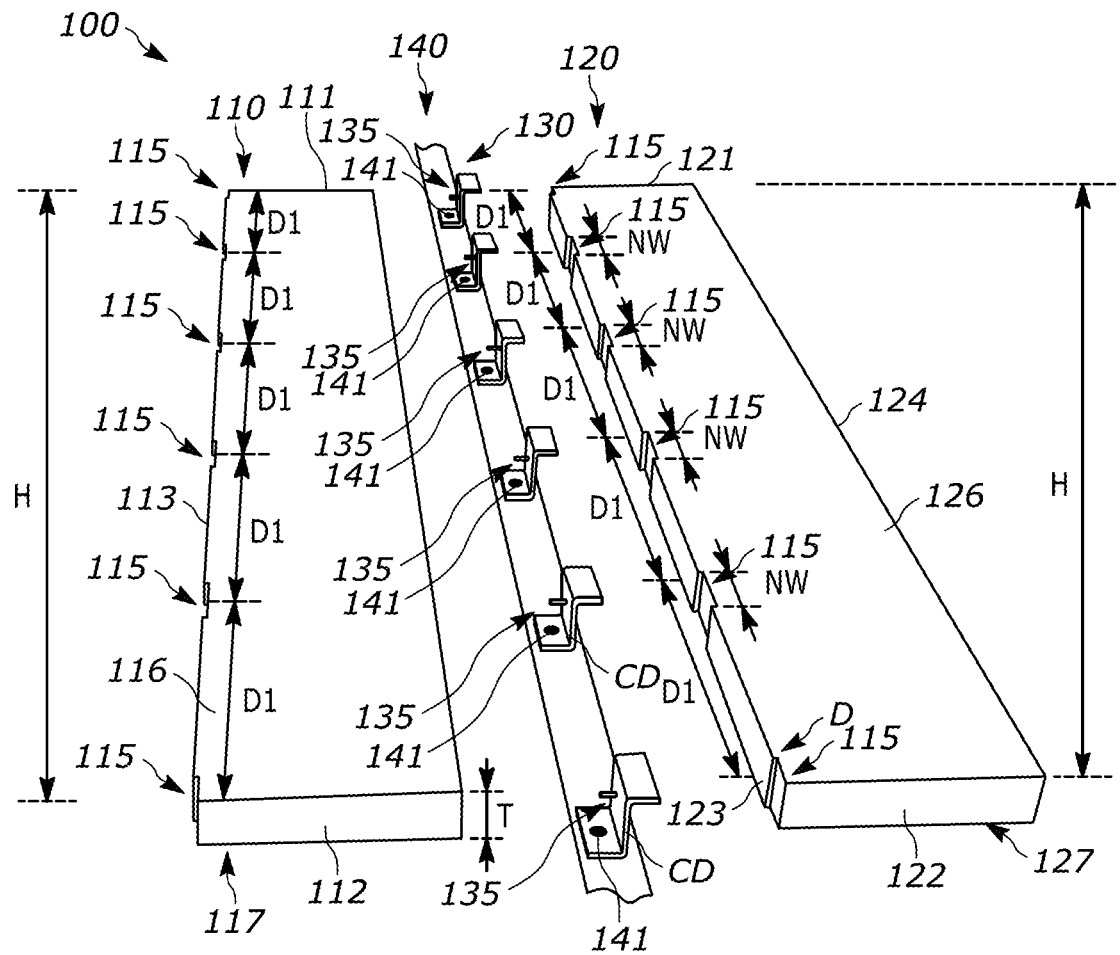
FIG. 1 illustrates an insulation system including a plurality of insulation panels and a plurality of clips, in accordance with at least one configuration.

While this disclosure is susceptible of configuration(s) in many different forms, there is shown in the drawings and described herein in detail a specific configuration(s) with the understanding that the present disclosure is to be considered as an exemplification and is not intended to be limited to the configuration(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, a system is disclosed, such as an insulation system 100. The insulation system 100 includes a plurality of insulation panels, such as a first insulation panel 110 and a second insulation panel 120, and a plurality of clips, such as a plurality of clips 130, the first and second insulation panels 110, 120 being substantially identical. The first insulation panel 110 includes a first end 111, a second end 112, a first side 113, a second side 114, a front surface 116, and a back surface 117. To facilitate positioning and installation of the first and second insulation panels 110, 120 against each other to mitigate air flow therebetween that would reduce their insulating effectiveness, the first insulation panel 110 further includes a plurality of edge notches 115 disposed along the first side 113 of the first insulation panel 110, the plurality of edge notches 115 including a depth ND. The second insulation panel 120 likewise includes a first end 121, a second end 122, a first side 123, a second side 124, a front surface 126, and a back surface 127. The second insulation panel 120 also includes the plurality of edge notches 115 disposed along the first side 123 of the second insulation panel 120. In at least one configuration, a distance D1 between any two of the plurality of clips 130 and any two of the plurality of edge notches 115 is substantially equal, as shown in FIG. 1.

In at least one configuration, the first and second insulation panels 110, 120 comprise a generally rectangular cuboid configuration, such as 4'×8' panels, with their thickness T varying according to their R-value, as known to those skilled in the art, although other shapes and dimensions are possible. Likewise, the plurality of clips 130 are made with a height H that can vary to correspond to the thickness T of the first and second insulation panels 110, 120, such that the height H of the clips 130 is substantially equal to the thickness of the first and second insulation panels 110, 120. In another configuration, the height H of the plurality of the clips 130 does not vary with the thickness of the first and second insulation panels 110, 120, the height H of the plurality of the clips 130 configured to accommodate a maximum possible thickness for the first and second insulation panels 110, 120. Also, in the configuration shown, the first and second insulation panels 110, 120 include six (6) edge notches 115 into which six (6) of the plurality of clips 130 are disposed during installation of the first and second insulation panels 110, 120. However, one skilled in the art would understand that the system 100 can include more or less than the six (6) edge notches 115 into which the Also, plurality of clips 130 are disposed during installation, respectively.

Figure 3:
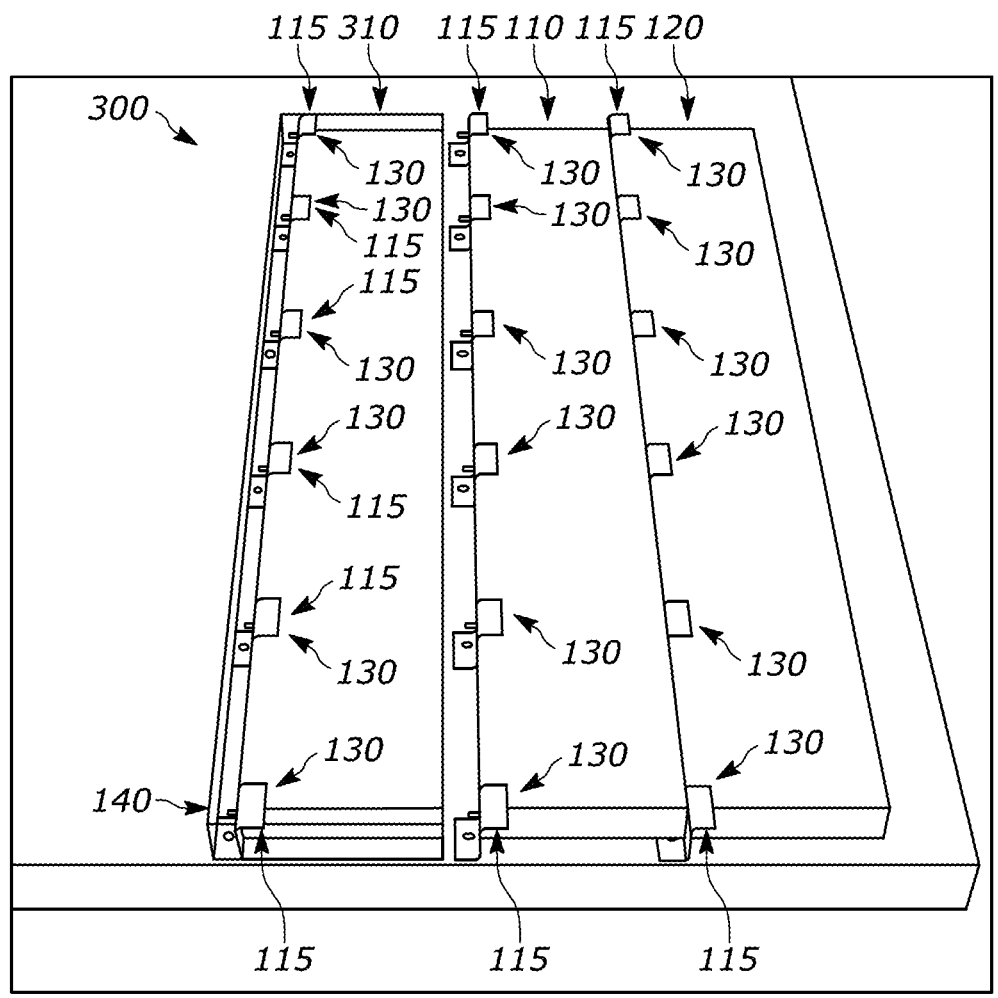
FIG. 3 illustrates another insulation system including installation of a third insulation panel, in accordance with at least one configuration.

The plurality of clips 130 each include a securing mechanism 135, a first side 131, a second side 132, a bottom end 133, and a top end 134. The plurality of clips 130 are, in at least one configuration, comprised of a composite material to mitigate heat transfer between the bottom end 133 of the plurality of clips 130 to the top end 134 of the plurality of clips 130. In at least one other configuration, the plurality of clips 130 are metal, such as aluminum or steel. The plurality of clips 130 further include a width CW that is substantially equal to a width NW of the plurality of edge notches 115 and the depth ND of the plurality of notches 115 is substantially equal to a depth CD of the plurality of clips 130. During the installation of the insulation system 100, the plurality of clips 130 are disposable within the plurality of edge notches 115 to allow the second side 114 of the first insulation panel 110 to contact the first side 123 of the second insulation panel 120, discussed in more detail below. The securing mechanism 135 secures the back surface 127 of the first insulation panel 110 against the plurality of clips 130, as shown in FIG. 3. The plurality of clips 130 are shown in various configurations in FIGS. 6a-6c which include various configurations for the securing mechanism 135, as discussed in detail below.

Typically, such plurality of clips 130 are made from a resin and fiber pultruded member (also known in the construction industry as a "girt") that is cut to size to form the plurality of clips 130, to which the securing mechanism 135 is coupled. Such girts may be provided in any number of standard sizes that may be from only a couple of feet long to spans that are forty to fifty feet long. It is most preferred that the plurality of clips 130 comprise a pultruded profile that includes both stranded members and woven members within a resin matrix. It will be understood that the shape can be formed through one or more pultrusion dies to achieve the final desired configuration. It is contemplated that a single resin system may be utilized, or that multiple resin systems may be utilized. Of course, the particular configuration and application may dictate changes to the relative thicknesses and dimensions of the different components. Among other fibers, it is contemplated that the fibers may comprise glass fibers (fiberglass), carbon fibers, cellulose fibers, nylon fibers, aramid fibers, and other such reinforcing fibers.

The clips 130 provide a thermal break. As used herein, the term "thermal break" refers to a break in like materials wherein the material disposed between like materials is comprised of a material having low thermal conductivity such as a polymeric material having a high R-value as further described below. R-values are measurements of the thermal resistance of different materials. R-values are well known by those skilled in the art of the construction and insulation industries. A high R-value indicates a highly insulative material, such as an R-value of R.2 per inch and higher. Conductive materials have a very low R-value, such as steel which exhibits a negligible or nearly non-existent R-value. In the configuration of the present disclosure, there are no like materials in contact with one another, nor is there any metal-to-metal contact creating a pathway for heat to transfer from the exterior to the interior and vice versa.

It is also contemplated that the plurality of clips 130 may comprise anticorrosive polymeric materials that exhibit high insulative qualities or rather, demonstrate high R-value properties such as an R-value in the range of about R.2 to about R8 per inch. Polymeric materials suitable for the present disclosure include thermoplastics or thermoset resin materials including for example: acrylonitrile-butadiene-styrene (ABS) copolymers, vinylesters epoxies, phenolic resins, polyvinyl chlorides (PVC), polyesters, polyurethanes, polyphenylsufone resin, polyarylsulfones, polyphthalimide, polyamides, aliphatic polyketones, acrylics, polyxylenes, polypropylenes, polycarbonates, polyphthalamides, polystyrenes, polyphenylsulfones, polyethersulfones, polyfluorocarbons, bio-resins and blends thereof. Other such thermoplastics and thermoplastic resins suitable for the present disclosure are known in the art which demonstrate high R-values and are thereby heat resistant as well as anticorrosive.

Thermoplastics of the present disclosure are also contemplated using a recyclable polymer or are made of a polymeric material which is partially comprised of a renewable resource such as vegetable oil or the like in its composition when an eco-friendly or "green" clip 130 is desired. The polymeric material of the present disclosure can also be reinforced with a reinforcing fiber as detailed below. Clips 130 composed of the materials discussed above form a thermal break between exterior panels and building substrates (e.g., a support beam 140) in an effort to control the temperature within a building structure by reducing or eliminating thermal conductivity from the exterior panel to the building substrate and vice versa. In assembly, the R-value of an exterior wall panel system of the present disclosure can typically exhibit an R-value from about R.2 to about R30 per inch depending on the thickness of the overall system, the insulation materials used and the composition of the insulation panels 110, 120, 310, 410 and clips 130. Further, microspheres, such as polymeric or glass nanospheres, can be added to the makeup of the clips 130 to provide further insulative properties and increased R-value expression.

Regarding the R-value of the plurality of clips 130 of the present disclosure, a relatively high R-value is desired to ensure adequate insulation of a building structure from outside elements by making a clip 130 that creates a thermal break in a wall panel system. A range of R-values for the polymeric materials used to construct the clips 130 described above would be a range of about R.2 to about R8 per inch in order to create a thermal break that effectively reduces or eliminates thermal bridging. The thermal conductivity, or K-value, is the reciprocal of the material's R-value, such that for a polymeric material exhibiting an R-value of about R.2 to R8 per inch, the correlating K-value for that material would be from about K5 to about K0.125 per inch. Thus, in comparison to present day metal components used in other insulation systems made of iron or steel, a polymeric bracket member of the present disclosure will exhibit a K-value of approximately about K.5 to about K0.125 per inch at a given set of conditions as compared to components made from a metallic material such as iron or steel which would have an approximate K-value as high as K32 to K60 per inch at the same conditions. This is because metallic materials, such as iron and steel, have low or negligible R-values and are well known conductors of heat. Steel is known to have an R-value of about 0.003R per inch. Thus, for example, a steel clip compared to a polymeric bracket of the present disclosure having an R-value of R.55 would be 183 times more thermally conductive.

Figure 2:
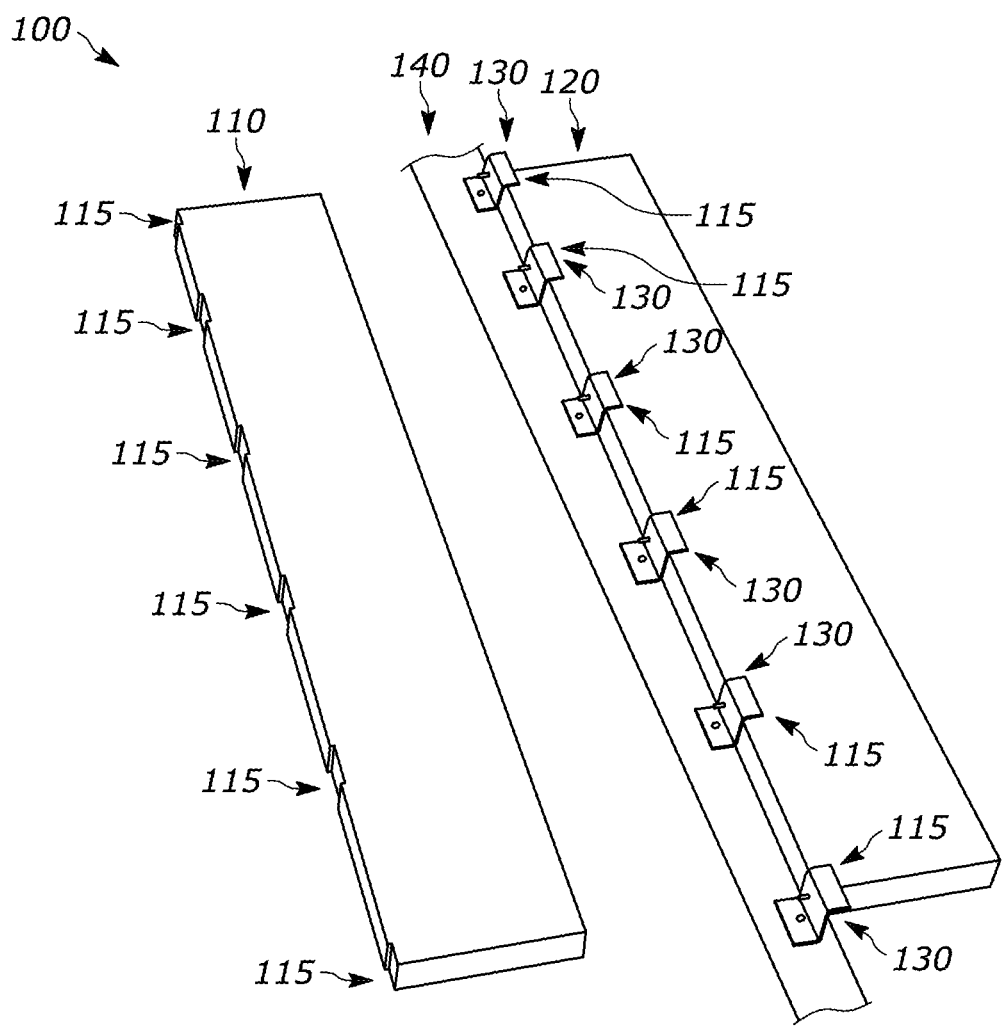
FIG. 2 illustrates the plurality of clips disposed in notches of one of the insulation panels shown in FIG. 1, in accordance with at least one configuration.

During installation of the insulation system 100, the plurality of clips 130 are first individually secured or coupled to the support beam 140 (e.g., a wall stud, a roof beam, or any other support beam), via a plurality of fasteners 141 such as screws, through an opening therethrough. In at least one configuration, the second insulation panel 120 is placed proximate to the support beam 140, that is the first side 123 of the second insulation panel 120 is aligned to be substantially parallel with the support beam 140. Then, one of the plurality of clips 130 is disposed within one of the plurality of edge notches 115, this clip 130 then being fastened (e.g., screwed) to the support beam 140. Thereafter, another one of the plurality of clips 130 is disposed within an empty one of the plurality of edge notches 115, this clip 130 then also fastened to the support beam 140. This individual disposition of the plurality of clips 130 within one of the plurality of edge notches 115 continues until all of the plurality of edge notches 115 include one of the plurality of clips 130 disposed therein, as shown in FIG. 2. In at least one configuration, depending upon a configuration of a structure, such as a wall or roof, to which the first and second insulation panels 110, 120 are being coupled to the plurality of edge notches 115 disposed at the first and second ends 121, 122 can be approximately half as wide as the remaining edge notches 115 disposed along the first side 123 of the second insulation panel 120. Such half width results in substantially half width of those plurality of clips 130 being disposed within those edge notches 115 extend beyond the first and second ends 121, 122, as shown in FIG. 2.

Figure 8:
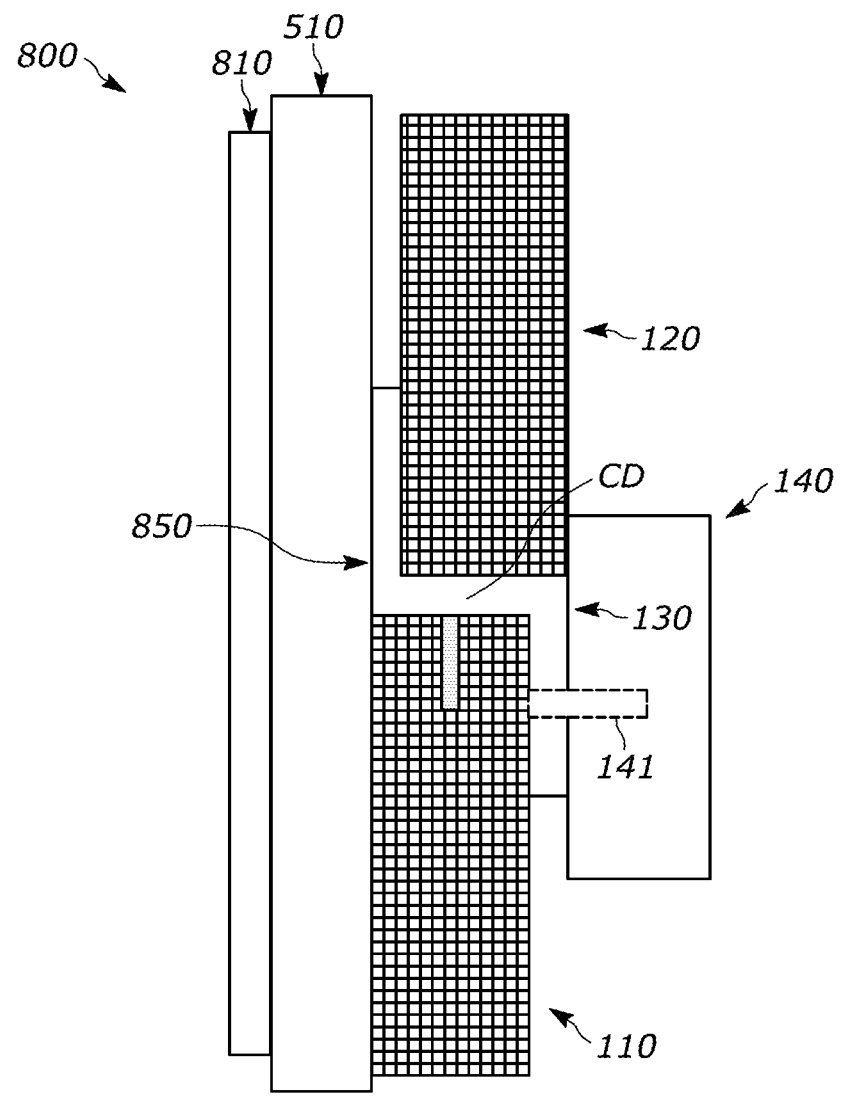
FIG. 8 illustrates a bottom view of the system shown in FIG. 5 further including a cladding coupled to a bracket member, in accordance with at least one configuration.

After the second insulation panel 120 is secured against the support beam 140 via the plurality of clips 130, the first insulation panel 110 is positioned against the second insulation panel 120 such that the second side 114 of the first insulation panel 110 is positioned against the first side 123 of the second insulation panel 110. The first end 111 of the first insulation panel 110 is also aligned with the first end 121 of the second insulation panel 120, forming a substantially planar surface across the first ends 111, 121, with a small degree of misalignment due to a step 850 created by the first end member 632 and the second end member 633, as shown in FIG. 8.

Figure 4:
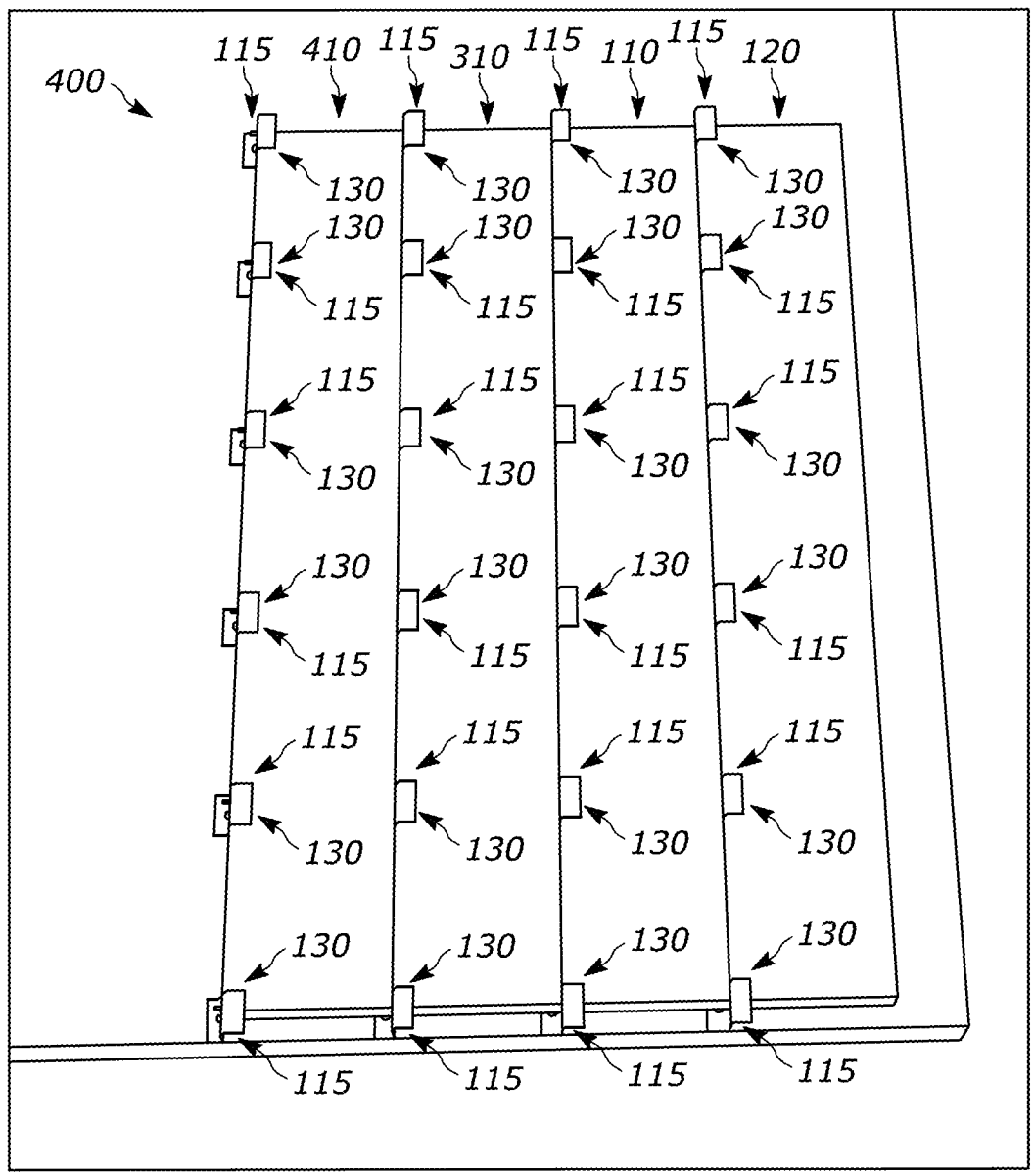
FIG. 4 illustrates another insulation system including installation of a fourth insulation panel, in accordance with at least one configuration.

Depending upon a size of the structure that the insulation system 100 is being installed on, one or more additional insulation panels are disposed against the first insulation panel 110, such as a third insulation panel 310 (FIG. 3) that is disposed against the first insulation panel 110 and a fourth insulation panel 410 (FIG. 4) that is disposed against the third insulation panel 310, thereby forming insulation systems 300, 400, respectively. The third and fourth insulation panels 310, 410 are installed similarly as the first and second insulation panels 110, 120, as discussed above. The first, third, and fourth insulation panels 110, 310, 410 are installed similarly as described above for the second insulation panel 120, that is the plurality of clips 130 are individual disposed within the plurality of notches 115 of the first, third, and fourth insulation panels 110, 310, 410 and fastened to their support beams, respectively. The plurality of edge notches 115 allow the first, second, third, and fourth insulation panels 110, 120, 310, 410 to form a substantially continuous insulation panel since the first, second, third, and fourth insulation panels 110, 120, 310, 410 have substantially no space therebetween, thereby minimizing energy losses therebetween and maximizing their insulation ability. The first, second, third, and fourth insulation panels 110, 120, 310, 410 can be comprised of mineral wool or a closed or open cell foam member. The foam member may be coated with a polymer coating which may have vapor barrier properties or slip resistant properties, among others. In addition, the foam member may have a vapor barrier (such as a polymer sheet or a metal foil, such as aluminum) applied in part or in whole to at least some of the surfaces thereof.

There are several different types of measurements that relate to a materials ability to insulate, resist, transmit or conduct heat across a material. Particularly, a material's K-value relates to a specific material's thermal conductivity, a material's C-value correlates to the material's thermal conductance, a material's R-value relates to a material's thermal resistance, and a U-value relates to the thermal transmittance of an overall system. In designing a wall, roof or deck bracket and panel system providing adequate insulative properties for a building structure, materials with low K-values and C-values are desired while materials with high R-values are desired. When this set of conditions is met, the overall thermal transmittance, or U-value, of the system is low. Thus, the lower the U-value, the lower the rate heat thermally bridges from one material to another. A building structure having a well-insulated system will have a much lower U-value than an uninsulated or poorly insulated system exhibiting high thermal transmittance.

In more detail, the first, second, third, and fourth insulation panels 110, 120, 310, 410 can also be fire retardant panels, sound dampening panels or any other type of insulating material or panel known in the art for providing an interior or exterior wall with a quality for which the panel is known. Other such insulating materials or panels include materials having additives like insecticides, fungicides or colorants for example, though many types of insulating materials are known in the art. For the purposes of the description below, as depicted in the accompanying figures, they are exemplified as panels, which may be sealed or unsealed, designed to insulate the building structure. Sealed panels provide a vapor barrier in the wall construction of the present disclosure. Other insulating materials suitable for use with the first, second, third, and fourth insulation panels 110, 120, 310, 410 include, but not be limited to, foam, fiberglass insulation, rigid insulation, semi rigid insulation, blanket insulation, loose fill insulation, spray foam in either fiberglass, rock wool, cellulose based, polystyrene, polyisocyanurate, polyurethane or other polymeric insulation formulations.

Figure 5:
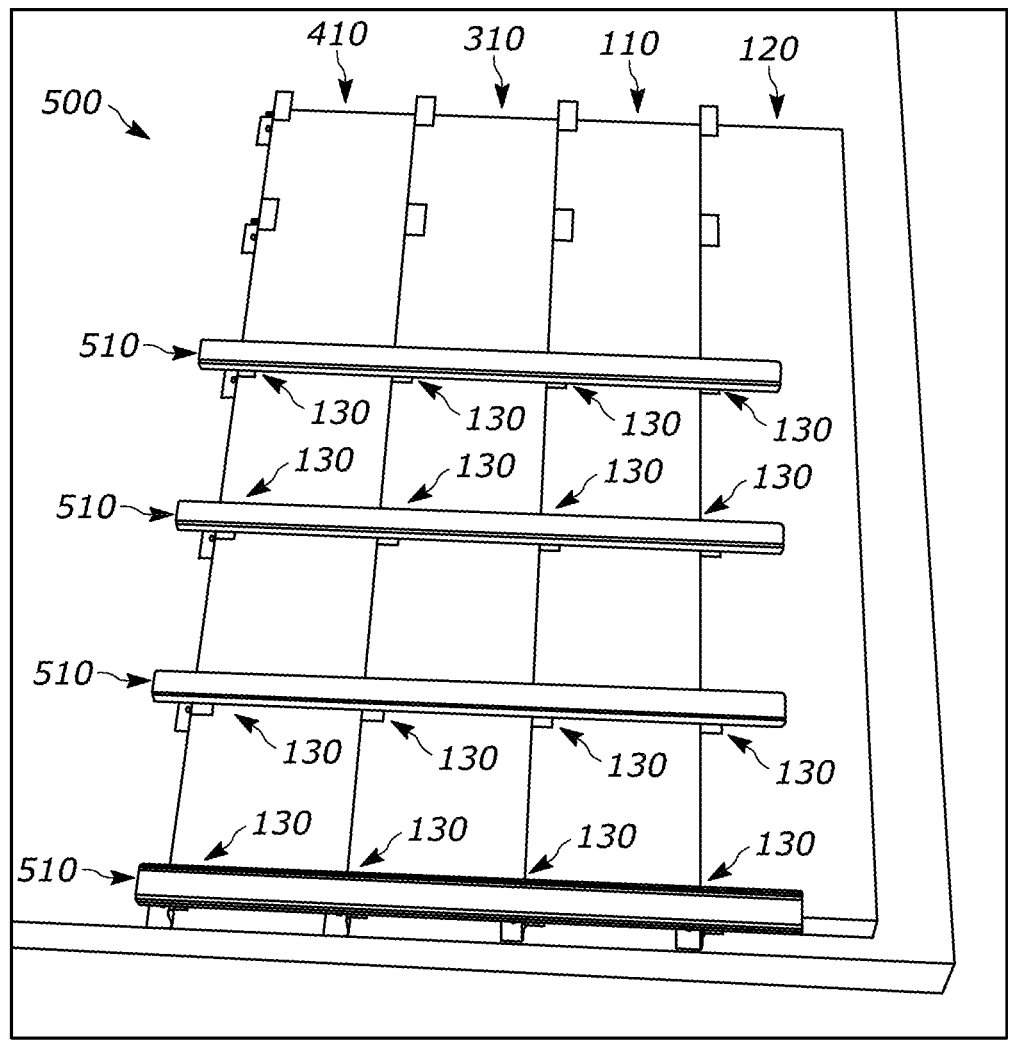
FIG. 5 illustrates another insulation system including coupling of a plurality of bracket members to the plurality of clips, in accordance with at least one configuration.

In at least one configuration, the insulation system 400 can further include a plurality of bracket members or girts, such as a plurality of bracket members 510 shown in FIG. 5, forming system 500. The bracket members 510 can comprise a metal, such as steel or aluminum, or resin and glass fiber, at least similar to the composition of the clips 130. The insulation system 500 is shown as comprising the insulation panels 110, 120, 310, 410 which are retained in position through use of the plurality of bracket member 510. As shown in FIG. 5, such as for a wall installation, a single one of the plurality of bracket members 510 is coupled (e.g., screwed) to the plurality of clips 130 that are disposed in substantially a straight line with each other. In the configuration shown, a single bracket member 510 is coupled to four (4) clips 130 that are disposed in a substantially straight line with each other, although a single bracket 510 can be coupled to more or less clips 130 that are disposed in a substantially straight line with each other. In at least one configuration, a system 800 (FIG. 8), shown from a bottom perspective of the system 500, includes the system 500 and further includes a cladding 810 (e.g., a corrugated sheet) that is coupled (e.g., screwed or bonded) to the plurality of bracket members 510, with one skilled in the art understanding that a single one of the plurality of bracket members 510 and a single one of the plurality of clips 130 shown for simplicity. It is also contemplated that the bracket members may extend either horizontally or vertically, depending on configuration.

Figures 7A, 7B:
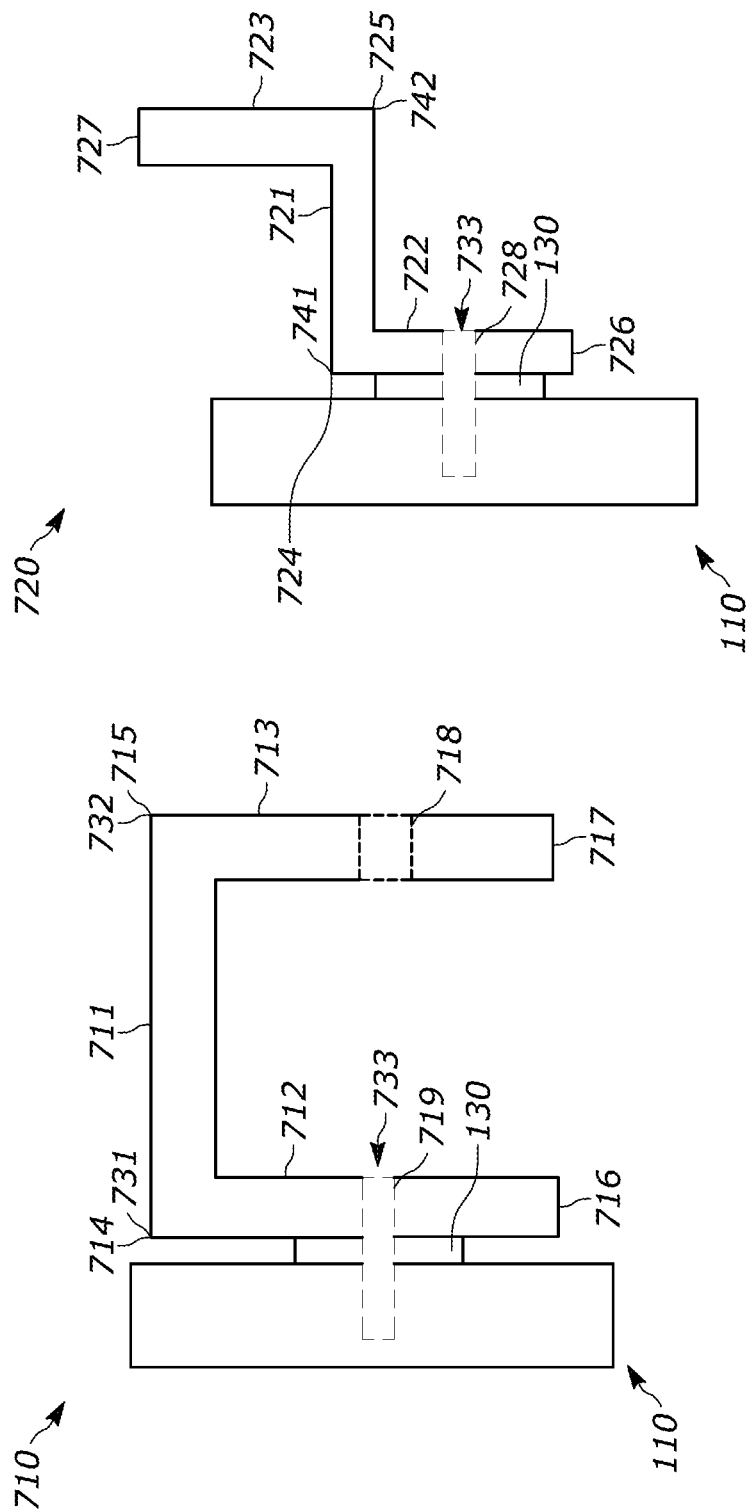
FIGS. 7a and 7b illustrate various configurations for the bracket members, in accordance with at least one configuration.

FIGS. 7a and 7b illustrate example profiles of the plurality of bracket members 510, such as a first bracket member 710 and a second bracket member 720. The first bracket 710 includes a central member 711 including a first end 731 and a second end 732 to which a first end member 712 and a second end member 713 are coupled at first ends 714, 715, thereof, respectively, forming a "U" shaped bracket. The first end member 712 and the second end member 713 are disposed perpendicular to the central member 711, and extend in a same direction from the central member 711. As shown, second ends 716, 717 of the first and second end members 712, 713, respectively, are uncoupled. The first bracket member 710 further includes an opening 718 that extends entirely through the second end member 713 to allow a screw driver (now shown) to extend into the first bracket member 710 to reach a fastener 733 (e.g., screw) disposed through the first end member 712. The first bracket member 710 further includes a second opening 719 that extends entirely through the first end member 712 to allow the fastener 733 to extend through the clip 130, and into an insulation panel, such as insulation panel 110, during installation.

FIG. 7b includes a central member 721 including a first end 741 and a second end 742 to which a first end member 722 and a second end member 723 are coupled at a first end 724 of the first end member 722 and a second end 725 of the second end member 723, respectively, forming a "Z" shaped bracket. The first end member 722 and the second end member 723 are disposed perpendicular to the central member 711, and extend in opposite directions from the central member 711. As shown, second ends 726, 727 of the first and second end members 722, 723, respectively, are uncoupled. The second bracket member 720 further includes an opening 728 that extends entirely through the first end member 722 to allow the fastener 733 to extend through the clip 130, and into an insulation panel, such as insulation panel 110, during installation.

As shown in FIGS. 6a-6c, the plurality of clips 130 each further including a body member 631 that extends from the top end 134 to the bottom end 133 of the plurality of clips 130. The plurality of clips 130 each further include a first end member 632 disposed substantially perpendicular to the body member 631, the first end member 632 extending in a first direction D1 away from the body member 631. The plurality of clips 130 each even further include a second end member 633 disposed substantially perpendicular to the body member 631, the second end member 633 extending in a second direction D2 opposite the first direction D1. The second end member 633 includes an opening, such as opening 685, through which the fastener 141 is disposed and to orient the body member 631 of the clip 130 substantially perpendicular to the support beam 140, during installation of the clip 130.

In a configuration of the securing mechanism 135, one of the plurality of clips 130 is shown in more detail in FIG. 6b. The post 136 is fixedly coupled substantially centrally to the body member 631 of each of the plurality of clips 130, the post 136 extending in a same direction as the second end member 633 and being substantially parallel to the second end member 633. As shown, the post 136 is coupled substantially perpendicular to the body member 631, such that the post 136 is pushed substantially centrally into the second side 114 of the first insulation panel 110, the post 136 being disposed substantially parallel to the front and back surface 116, 117 of the first insulation panel 110 during installation of the first installation panel 110.

Another configuration of the plurality of clips is shown in FIG. 6a, one of a plurality of clips 670 shown in detail in FIG. 6a. In another configuration of the securing mechanism 135, the securing mechanism 135 can include a blade 651 that is fixedly coupled substantially centrally to the body member 631 of each of the plurality of clips 130, the blade 651 extending in a same direction as the second end member 633 and being substantially parallel to the second end member 633, such that the blade 651 is pushed substantially centrally into the second side 114 of the first insulation panel 110, the blade 651 being disposed substantially parallel to the front and back surface 116, 117 of the first insulation panel 110 during installation of the first installation panel 110. As shown, the blade 651 tapers from a wider portion where the blade 651 is coupled to the body member 631 to a narrower portion at a distal end therefrom. The blade 651 is pushed substantially centrally into the second side 114 of the first insulation panel 110, with this tapering assists the blade 651 to push into the second side 114 of the first insulation panel 110.

Yet another configuration of the plurality of clips is shown in FIG. 6c, one of a plurality of clips 680 shown in detail in FIG. 6c. In yet another configuration of the clip x80 includes the securing mechanism 135, the securing mechanism 135 can include a first lip 671 fixedly coupled to the first end member 632, the first lip 671 extending in the second direction D2, together forming a substantially planar surface. The securing mechanism 135 can further include a second lip 672 fixedly coupled to the second end member 632, the second lip 672 extending in the first direction D1 opposite the second direction D2, together forming a planar surface. During installation of the system 100 the first lip 671 extends onto the front surface 116 of the first insulation panel 110 and the second lip 672 extends onto the back surface 127 of the second insulation panel 120, thereby keeping the first insulation panel 110 and the second insulation panel 120 in a substantially planar configuration with respect to each other.

Features disclosed herein as being substantially configured can vary (e.g., +−10%), without departing from the scope of this disclosure. The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An insulation system, comprising:
a first insulation board including a first end, a second end, a first side, a second side, a front surface, and a back surface, the first insulation board including a plurality of notches disposed along the first side of the first insulation board;
a second insulation board including a first end, a second end, a first side, a second side, a front surface, and a back surface, the second insulation board including a plurality of notches disposed along the first side of the second insulation board; and
a plurality of clips each including a body member extending from a top end to a bottom end and having a first side and a second side, each clip further including a first end member extending substantially perpendicular in a first direction away from the body member, a second end member extending substantially perpendicular in a second direction opposite the first direction and away from the body member, and a securing mechanism extending substantially perpendicular from the first side of the body member;
wherein during installation of the insulation system the plurality of clips are coupled to a support beam and disposed within the plurality of notches of the second insulation board, the plurality of clips further including a width that is substantially equal to a width of the plurality of notches such that during the installation of the insulation system the plurality of clips are disposable within the plurality of notches to allow the second side of the first insulation board to contact the first side of the second insulation board and the securing mechanism secures the back surface and second side surface of the first insulation board against the plurality of clips.

2. The insulation system according to claim 1, further comprising a plurality of girts to couple to the plurality of clips, such that a single one of the plurality of girts couples the plurality of clips that are disposed in substantially a straight line.

3. The insulation system according to claim 1, wherein a distance between any two of the plurality of clips and any two of the plurality of notches is substantially equal.

4. The insulation system according to claim 1, further comprising a plurality of screws to couple the plurality of clips to the support beam.

5. The insulation system according to claim 1, wherein the securing mechanism comprises a blade fixedly coupled substantially centrally to the body member of each of the plurality of clips, such that the blade is pushed into the second side of the first insulation board during installation of the first installation board.

6. The insulation system according to claim 1, wherein the securing mechanism comprises a post fixedly coupled substantially centrally to the body member of each of the plurality of clips, such that the post is pushed into the second side of the first insulation board during installation of the first installation board.

7. The insulation system according to claim 1, wherein the securing mechanism comprises a first lip fixedly coupled to the top end of the body member, the first lip extending in the second direction, and further comprising a second lip fixedly coupled to the bottom end of the body member, the second lip extending substantially perpendicular away from the body member in the first direction.

8. The insulation system according to claim 1, further comprising a plurality of girts coupled to the plurality of clips, the plurality of girts being disposed substantially perpendicular to a height of the first and second insulation board, during installation of the insulation system.

9. The insulation system according to claim 8, further comprising cladding coupled to the plurality of girts.

10. The insulation system according to claim 1, wherein the plurality of clips are comprised of a composite material to mitigate heat transfer from the bottom end of the plurality of clips to the top end of the plurality of clips.

11. The insulation system according to claim 10, wherein the composite material is a resin and fiber, the fiber comprised of at least one of glass fibers, carbon fibers, cellulose fibers, nylon fibers, and aramid fibers.

12. A method of installing an insulation system of claim 1, comprising the steps of:
coupling the plurality of clips to the support beam;
disposing within the plurality of notches of the second insulation board;
disposing the plurality of clips within the plurality of notches to allow the second side of the first insulation board to contact the first side of the second insulation board; and
securing, with the securing mechanism, the back surface and second side surface of the first insulation board against the plurality of clips.

* * * * *